United States Patent
Tippetts et al.

[15] 3,690,171
[45] Sept. 12, 1972

[54] FLUID FLOW MEASUREMENT
[72] Inventors: John Russell Tippetts, Sheffield; Jack Alexander Golder, Appleton; John Grant, Warrington, all of England
[73] Assignee: United Kingdom Atomic Energy Authority, London, England
[22] Filed: Oct. 15, 1970
[21] Appl. No.: 80,938

[30] Foreign Application Priority Data
Oct. 29, 1969 Great Britain..........52,953/69

[52] U.S. Cl. ..............................................73/194 B
[51] Int. Cl. ................................................G01f 1/00
[58] Field of Search ...................73/194; 137/81.5

[56] References Cited

UNITED STATES PATENTS 3,273,377   9/1966   Testerman..................73/23.1
3,016,066   1/1962   Warren......................137/81.5
3,504,691   4/1970   Campagnuolo...........137/81.5
3,564,915   2/1971   Tomota et al. ..............73/194
3,373,600   3/1968   Taplin .......................137/81.5

Primary Examiner—Richard C. Queisser
Assistant Examiner—Herbert Goldstein
Attorney—Larson, Taylor and Hinds

[57] ABSTRACT

A fluidic oscillator may be used to measure the flow rate of fluids. In a flow meter in accordance with the invention a fluidic oscillator has its control ports cross-connected to induce oscillation and differential pressure sensing means housed in the connection between the fluid outlet channels of the oscillator for converting alternating pressure in those channels to an electrical signal.

5 Claims, 2 Drawing Figures

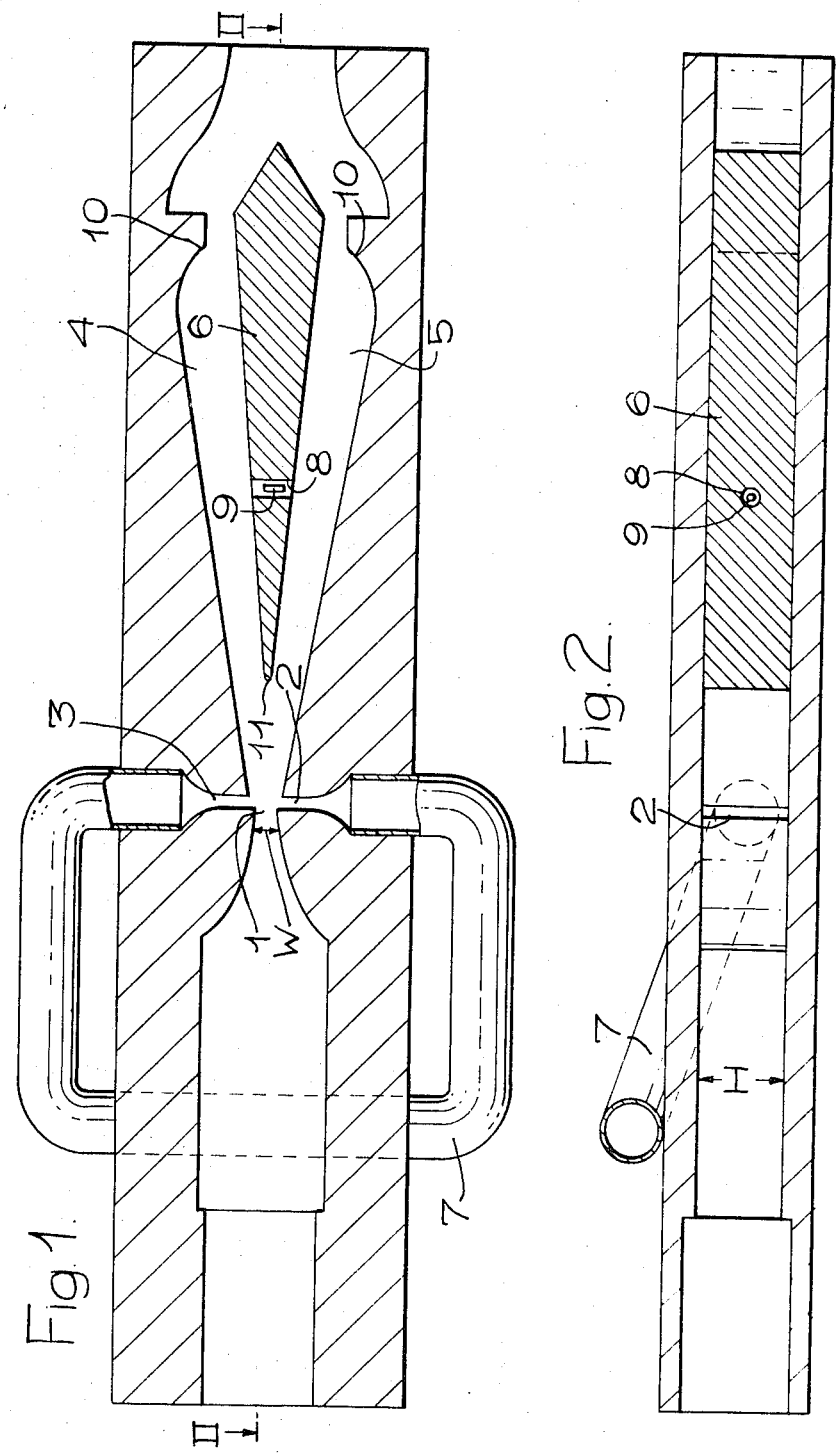

FLUID FLOW MEASUREMENT

BACKGROUND OF THE INVENTION

This invention relates to fluid flow measurement.

The invention is based on the concept that a fluidic oscillator may be used to measure the rate of flow of gases and liquids. By "fluidic oscillator" is meant a fluid amplifier operating on the Coanda principle and self-switching cyclicly between two states of flow, such a fluid amplifier having two fluid outlet channels separated by a splitter and two control ports arranged so that pressure can be exerted through the control ports to direct fluid issuing in a jet from a nozzle in the amplifier from either of the fluid outlet channels to the other fluid outlet channel. The frequency of oscillation of the jet between the two outlet channels in the oscillator is proportional to flow rate through the oscillator over a certain range of flow rate and hence, by measuring the frequency of oscillation, flow rate may be determined. For a given device the range over which the frequency and flow rate are linearly proportional is normally limited however, and calibration outside this range is difficult. There are also problems in providing a frequency detector which will not itself upset the flow or frequency of oscillation.

SUMMARY OF THE INVENTION

According to the present invention a fluid flow meter comprises a fluidic oscillator in which oscillation is induced between its control ports, and a differential pressure sensing means housed in a connection extending between the fluid outlet channels of the oscillator for converting alternating pressure in those channels to an electrical signal.

Preferably flow restrictions are provided in the outlet channels of the oscillator downstream of the connection housing the differential pressure transducer. These restrictions are particularly advantageous at low flow rates.

Various types of transducer may be employed, for example, electro-magnetic, piezo electric crystal, moving iron strain gauge or hot film types.

DESCRIPTION OF THE DRAWINGS

The invention will now be described by way of example only with reference to the accompanying drawings wherein FIG. 1 is a diagrammatic view in medial section, and
FIG. 2 is a section on the line II—II of FIG. 1.

DESCRIPTION OF THE PREFERRED EMBODIMENT

The drawings shows a fluidic oscillator having an entry nozzle 1, control ports 2, 3, outlet channels 4, 5 and a splitter 6. The control ports 2, 3 are connected together by a pipe 7. A channel 8 provides a connection extending between the outlet channels 4, 5. In this channel 8 is housed a microphone 9 providing electromagnetic differential pressure sensing means which is electrically connected with a frequency meter calibrated in terms of flow rate. Restrictions 10 are provided in the outlet channels 4, 5 downstream of the channel 8. As an alternative to a frequency meter a counter indicating the integrated (total) flow over a period may be employed.

The relationship between frequency of oscillation and flow rate will depend on the dimensions of the fluidic oscillator, for example, the absolute and relative distances from the control ports 2, 3 to the entry nozzle 1 and to the apex 11 of the splitter 6. Of major influence however is the aspect ratio, that is the ratio of the dimension H in FIG. 2 of the drawings to that of the dimension W in FIG. 1. In the example the aspect ratio is 6:1. In general, increasing the aspect ratio increases the frequency of oscillation. Also oscillation will occur at lower flow rates if H is increased.

We claim:

1. A fluid flow meter apparatus comprising a duct, a fluidic oscillator in said duct in which fluid oscillation is induced by a cross section between its control ports, said fluidic oscillator having an inlet nozzle and outlet channels, a connection member extending between said outlet channels, a differential pressure sensing means housed in said connection member for converting alternating pressure in said outlet channels to an electrical signal, flow restrictions provided in the outlet channels of the oscillator downstream of the connection housing the differential pressure sensing means, said duct communicating with said inlet nozzle at one end and connecting said outlet channels at the other end.

2. A fluid flow meter as claimed in claim 1 wherein the differential pressure sensing means is electromagnetic.

3. A fluid flow meter as claimed in claim 1 with means including a frequency meter correlating the electrical signal with the flow rate.

4. A fluid flow meter as claimed in claim 1 with means including a counter correlating the electrical signal with the flow rate.

5. A fluid flow meter as claimed in claim 1 wherein the connection housing the differential pressure sensing means extends through the connection number separating the fluid outlet channels.

* * * * *